United States Patent [19]  
Chadwick

[11] Patent Number: 4,633,256  
[45] Date of Patent: Dec. 30, 1986

[54] METHOD AND APPARATUS FOR FOUR-BEAM RADAR

[75] Inventor: Russell B. Chadwick, Boulder, Colo.

[73] Assignee: The United States of America as represented by the Secretary of Commerce, Washington, D.C.

[21] Appl. No.: 680,114

[22] Filed: Dec. 10, 1984

[51] Int. Cl.[4] ............................................. H01Q 3/26
[52] U.S. Cl. ................................................... 342/368
[58] Field of Search .............. 343/525, 5 W, 9 R, 368, 343/371–374

[56] References Cited  
U.S. PATENT DOCUMENTS 3,135,959 6/1964 Moran .................................. 343/9 X  
3,202,991 8/1965 Howells ............................... 343/368  
4,010,474 3/1977 Provencher .................... 343/374 X Primary Examiner—Theodore M. Blum  
Assistant Examiner—Bernarr Earl Gregory  
Attorney, Agent, or Firm—Eugene J. Pawlikowski; Alvin J. Englert; David A. Blumenthal

[57] ABSTRACT

A method and apparatus for producing remote profiling beams pointing alternately to the north, east, west or south by ordered distribution of phase shifts to elements of a square antenna array. Elements within a given group of four array elements share a related group of four phase shift means. Elements in a group trade phase shift means intragroup but there is no intergroup trading. The arrangement permits four-beam capability without unduly increasing the cost or complexity of the radar assembly over prior art assemblies. Also disclosed is a system for "tipping" the array either virtually or physically to obtain a vertical beam.

3 Claims, 17 Drawing Figures

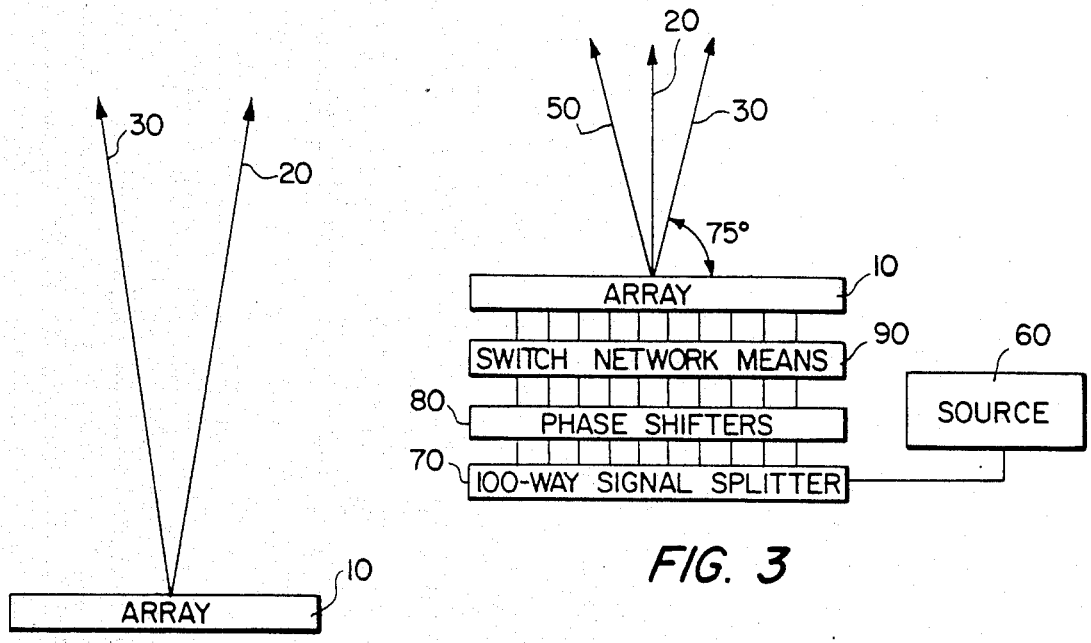
FIG. 1
FIG. 3
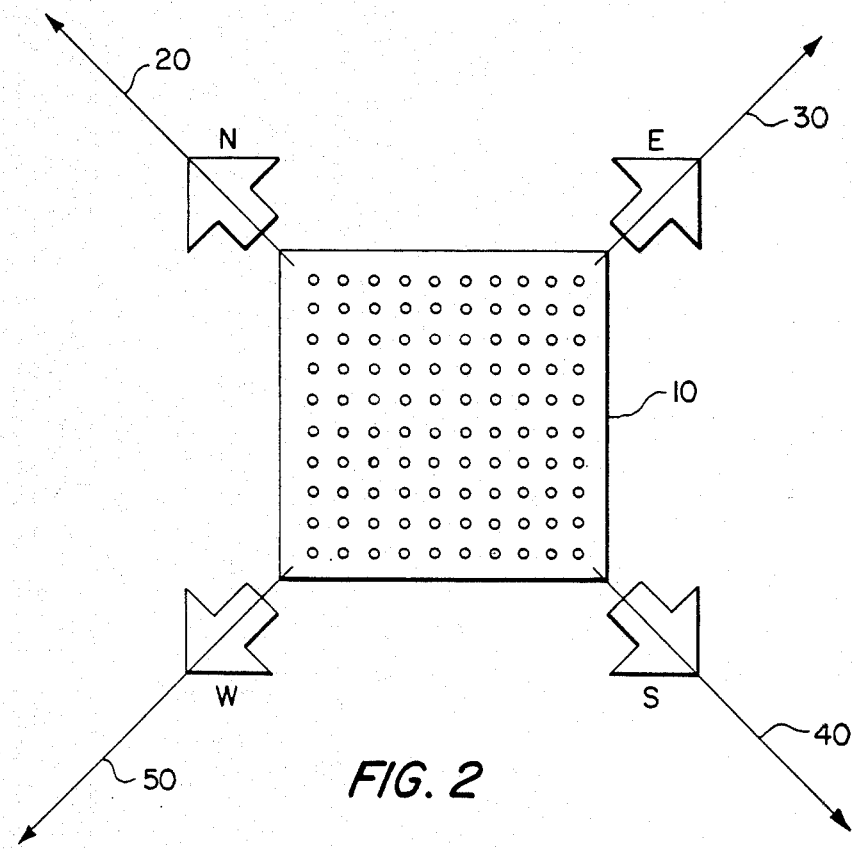
FIG. 2

N ↖

```
9 8 7 6 5 4 3 2 1 0
8 7 6 5 4 3 2 1 0 -1
7 6 5 4 3 2 1 0 -1 -2
6 5 4 3 2 1 0 -1 -2 -3
5 4 3 2 1 0 -1 -2 -3 -4
4 3 2 1 0 -1 -2 -3 -4 -5
3 2 1 0 -1 -2 -3 -4 -5 -6
2 1 0 -1 -2 -3 -4 -5 -6 -7
1 0 -1 -2 -3 -4 -5 -6 -7 -8
0 -1 -2 -3 -4 -5 -6 -7 -8 -9
```

↗ E

A↓
```
 0  1  2  3  4  5  6  7  8  9
-1  0  1  2  3  4  5  6  7  8
-2 -1  0  1  2  3  4  5  6  7
-3 -2 -1  0  1  2  3  4  5  6
-4 -3 -2 -1  0  1  2  3  4  5
-5 -4 -3 -2 -1  0  1  2  3  4
-6 -5 -4 -3 -2 -1  0  1  2  3
-7 -6 -5 -4 -3 -2 -1  0  1  2
-8 -7 -6 -5 -4 -3 -2 -1  0  1
-9 -8 -7 -6 -5 -4 -3 -2 -1  0
```

```
 0 -1 -2 -3 -4 -5 -6 -7 -8 -9
 1  0 -1 -2 -3 -4 -5 -6 -7 -8
 2  1  0 -1 -2 -3 -4 -5 -6 -7
 3  2  1  0 -1 -2 -3 -4 -5 -6
 4  3  2  1  0 -1 -2 -3 -4 -5
 5  4  3  2  1  0 -1 -2 -3 -4
 6  5  4  3  2  1  0 -1 -2 -3
 7  6  5  4  3  2  1  0 -1 -2
 8  7  6  5  4  3  2  1  0 -1
 9  8  7  6  5  4  3  2  1  0
```

↙ W

```
-9 -8 -7 -6 -5 -4 -3 -2 -1  0
-8 -7 -6 -5 -4 -3 -2 -1  0  1
-7 -6 -5 -4 -3 -2 -1  0  1  2
-6 -5 -4 -3 -2 -1  0  1  2  3
-5 -4 -3 -2 -1  0  1  2  3  4
-4 -3 -2 -1  0  1  2  3  4  5
-3 -2 -1  0  1  2  3  4  5  6
-2 -1  0  1  2  3  4  5  6  7
-1  0  1  2  3  4  5  6  7  8
 0  1  2  3  4  5  6  7  8  9
```

↘ S

METHOD AND APPARATUS FOR FOUR-BEAM RADAR

BACKGROUND OF THE INVENTION

This invention relates to multiple-beam radar systems, and more specifically to multiple-beam radar systems used in clear air wind profiling.

In various aeronautic and meteorological pursuits, it is sometimes desirable to profile the velocity and velocity gradient of air flowing through a predetermined volume or cell of the atmosphere. Measurements are typically taken a significant distance above a ground location by means of a Doppler radar capable of detecting the motion of air.

The basic geometry of remote wind profiling is shown in FIG. 1. The goal is to determine the wind velocity vector at a given point in space. Typically, this vector is inferred from direct and indirect measurements of velocity and velocity gradients obtained with radar beams directed in the vicinity of the point of interest. Two such beams, 20 and 30 directed to the North and East, respectively, by an array 10 of antenna elements are shown in FIG. 1. These beams are elevated with respect to the horizontal plane. Typically, array 10 may be a multielement parasitic array of linear (dipole type) elements. Such an array is commonly referred to as a Yagi-Uda or simply Yagi array, after its inventors. Specifically, array 10 is a square, regular array of such elements having each of its four corners pointed in the direction of respective points of the compass.

As is well known, the direction of a beam produced by an array is a function of the relative phase of the antenna elements. The two beams produced by an array such as that just described are thus produced alternately rather than simultaneously by altering the phase relation between the respective antenna elements in a known fashion.

It is also known to use an array such as that described to produce three beams, the third beam being vertical and used to measure directly a vertical component of wind velocity.

In theory it is possible, by appropriate phasing alternately to obtain any desired number of beams from an array such as that described. These beams could then be used to measure directly sufficient air velocity data that air velocity in the cell could be determined to any desired degree of precision. It must be appreciated, however, that using prior art techniques, the number of switches necessary and the concomitant complexity of such systems increase exponentially with the number of beams. Therefore, in prior art systems, there exists a tradeoff between the need and desire for more complete measurement of air velocity components versus a need to keep the cost and complexity of the system necessary to make those measurements as low as possible.

SUMMARY OF THE INVENTION

The present invention resides in a method and apparatus for providing four-beam capability to an array without unduly increasing the cost and complexity thereof. The invention exploits a hitherto unappreciated relationship between the position of a given element in a square, regular array and the respective phase differences of signals applied to the element in alternate propagation of the four beams. Each element of the array is grouped with three other elements, all four elements sequentially sharing a group of phase shift values generated by an associated group of four phase shifters.

The present invention also involves an apparatus for creating a vertical beam as one of the four beams generated by the array. This vertical beam permits direct measurement of the vertical component of the wind.

BRIEF DESCRIPTION OF THE DRAWINGS

These and other features and advantages of the present inventon will be most easily understood with reference to the following drawings, in which:

FIG. 1 is a diagram showing the geometry of conventional two-beam remote profiling;

FIG. 2 is a top plan schematic view of a multiple-beam radar array according to one embodiment of the present invention;

FIG. 3 is a schematic diagram of the array shown in FIG. 2;

DETAILED DESCRIPTION OF THE PREFERRED EMBODIMENTS

Figures 4A, 4B, 4C, 4D, 6:
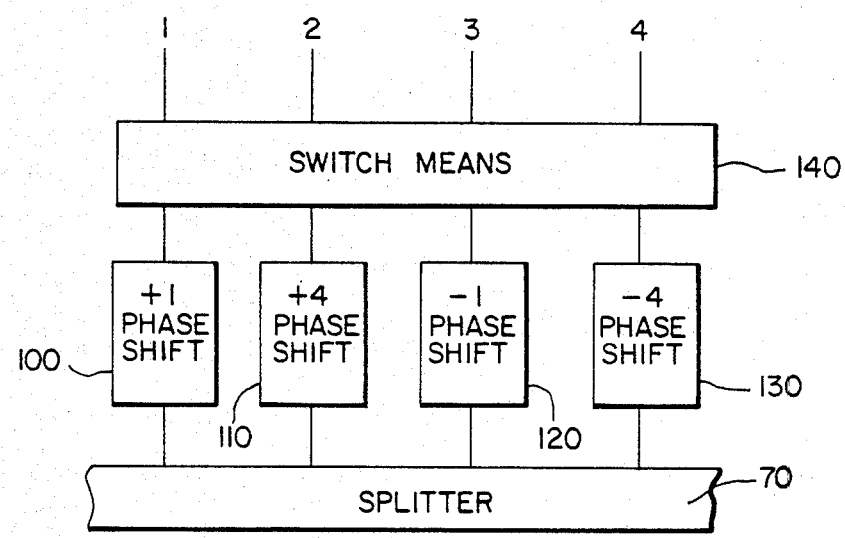
FIGS. 4a–4d are diagrams showing phase relationships of the elements shown in FIG. 2 to alternately generate four beams pointing respectively in projection along the respective half-diagonals of the array as indicated.
FIG. 6 is a schematic diagram of elements associated with one group of four radar elements and its associated group of four phase shifters.

FIG. 2 shows a schematic plan view of a radar array 10. This array serves as an antenna for a 400 MHz radar. Array 10 is an array of individual Yagi-Uda elements looking in the vertical direction. It is a 10×10 matrix, 8.5 meters on each side in the preferred embodiment, with the diagonals of the square pointing north and east.

The individual elements are phased so that beams are alternately formed at 75° elevation angles in the north, east, south, and west, labelled 20, 30, 40 and 50, respectively. Each beam is selected as determined by a set of transfer switches as will be illustrated and explained below.

By referring to FIG. 3, it can be seen that the beams have an elevation angle of approximately 75°. As illustrated, the array 10 is driven by a source 60 connected to a 100-way signal splitter 70. The signal splitter 70 then feeds 100 separate signals to phase shifters 80. In the preferred embodiment, the phase shifters 80 are separate cables each having a length selected to establish signal paths which will create a desired phase shift. Cables are used in the preferred embodiment because they are inexpensive and reliable. It will be readily appreciated by one of ordinary skill in the art, however, that any appropriate phase shifter may be used. Phase shifters 80 are connected in turn to switch network means 90 for selectably connecting each phase shifter to one element of array 10.

FIGS. 4a to 4d show four different phasing arrangements to produce four different beams. In the phasing arrangement of FIG. 4a, each integer represents a phase difference of 76° (electrical), creating a beam at a 75° elevation angle to the north. This will be referred to as the north beam pattern. Positive integers indicate a corresponding number of 76° phase lags for the element situated at a corresponding site in the array with respect to the 10 elements on the main diagonal orthogonal to the beam direction. Negative integers indicate a 76° phase lead for the element situated at a site so labelled with respect to the 10 elements on the orthogonal diagonal.

As might be noted from the four patterns of numbers representing the array in its four respective propagation modes, the pattern for a beam propagating in a first direction corresponds to the pattern for a second beam propagating in a second direction 90° to the first direction after that second beam pattern has been rotated 90°. In other words, the north beam pattern illustrated in FIG. 4a corresponds to the west beam pattern illustrated in FIG. 4c rotated clockwise 90°. It can also be discerned from patterns in FIGS. 4a–4d that the pattern for a beam propagating in a given direction is the mirror image of the pattern for a beam propagating in an adjacent direction, the plane of reflection being taken to be orthogonal to the common side of the two directions in the drawing. In other words, for example, the north beam pattern shown in FIG. 4a can be obtained by reflecting the east beam pattern shown in FIG. 4b across a plane parallel to the left hand column of the east beam pattern shown in phantom in FIG. 4b and labelled "A."

A third way of conceptualizing the relationship between patterns is to regard the east beam pattern, for example, as the north beam pattern "turned over." For example, if the north beam pattern were on the left hand page of an open book, with the arrow pointing north, and that page were turned so that it became the right hand page, the arrow would point to the east and the integer pattern would be the east beam pattern.

Figure 5:
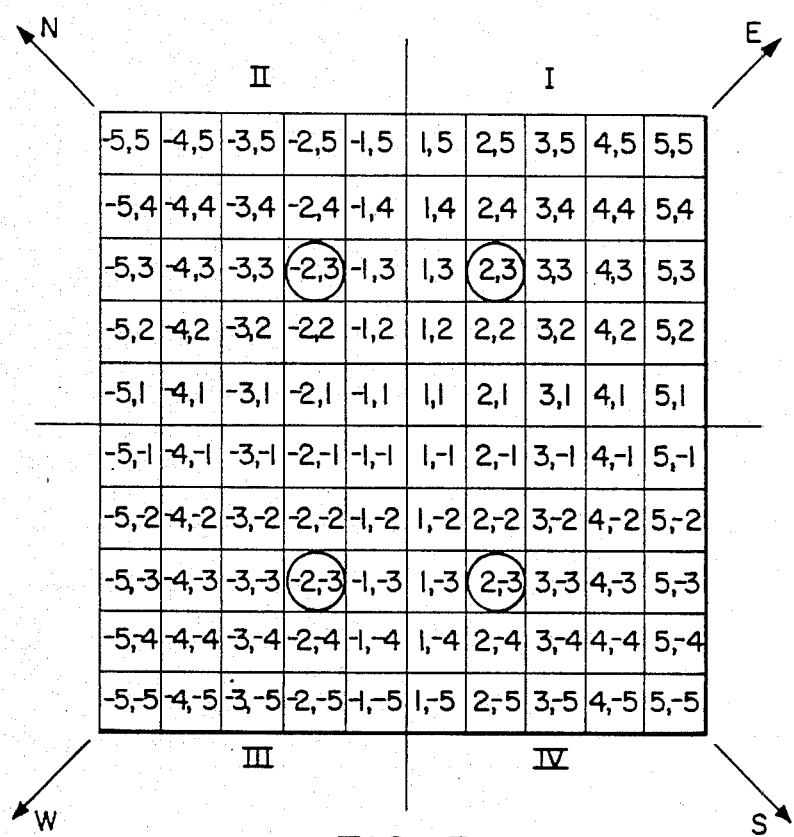
FIG. 5 is a diagram showing assignment of position coordinates to each element of the array.

FIG. 5 illustrates an ordered scheme for uniquely identifying the elements in the array 10. The array is divided into four quadrants labelled I, II, III and IV. The element in quadrant I adjacent adjacent the center of the array is assigned the position coordinates (1,1). Similarly, the element in quadrant II, moving counter-clockwise, adjacent the center of the array is assigned position coordinates (−1,1), and so on. The elements are numbered as if the element at the center of the box so labeled is positioned on a grid having its origin at the center of the array. It is to be noted, however, that there are no position coordinates which include zero as a coordinate. The x-coordinate of the position coordinates decreases with movement to the left and the y-coordinate with movement down. For the 10×10 array under consideration, the highest absolute magnitude of any coordinate is 5. Thus, the position coordinates together comprise every possible combination of coordinate pairs from 5 to −5 with zeros excluded.

Now, let (j,k) represent (±j,±k) where j and k are integers between 1 and 5, inclusively. Then the ordered coordinate pair (j,k) uniquely represents a group of four position coordinates (+j,+k), (+j,−k), (−j,+k), and (−j,−k). There are $5^2$ or 25 such ordered coordinate pairs identifying a like number of groups of four radar elements in the 10×10 array being discussed. With the array elements so identified, certain relationships between the elements can now be described quite simply. For example, consider the element group uniquely identified by the ordered coordinate pair (2,3); i.e., the four elements having position coordinates (+2,+3). This ordered coordinate pair uniquely determines a group of four array elements at (2,3), (−2,3), (−2,−3), and (2,−3). These elements for the purposes of the present discussion will be labeled 1–4, respectively. They have been circled in FIG. 5.

Using the beam patterns depicted in FIGS. 4a–4d, it can be seen that these array elements successively share a set of four phase values as indicated in the following table.

TABLE 1

| ELEMENTS | 1 | 2 | 3 | 4 |
|---|---|---|---|---|
| NORTH | 1 | 4 | −1 | −4 |
| EAST | 4 | 1 | −4 | −1 |
| SOUTH | −1 | −4 | 1 | 4 |
| WEST | −4 | −1 | 4 | 1 |

From the table, it can be seen that elements 1–4 alternately receive signals having phase shifts of 1, 4, −1, or −4, depending on the direction of desired beam propagation. A similar observation is true of the other 24 groups of four elements identifiable by the ordered coordinate pair (j,k). Moreover, just as the element group just described needs only one group of four phase shifters no matter which beam direction is desired, each element group uses only one phasing group of four phase shifters in a similar way. In other words, all switching is intragroup. There is no intergroup switching.

With this insight, the switching scheme becomes relatively simple, and capable of being effected with a relatively few number of switches. Precisely, it is only necessary to have 25 different four pole, four throw (4P4T) switches, one for each element group and its associated phasing group. The connection for these switches is shown in FIG. 6 for the (2,3) group just discussed. Signal splitter 70 sends four signals one each to each of phase shifters 100, 110, 120, and 130 which form part of phase shifters 80 (FIG. 3). These phase shifters respectively create phase shifts of +1, +4, −1, and −4. The signals then enter switch means 140, part of switch network means 90. The switch means then selectably connect each of phase shifters 100–130 to one of elements 1–4.

Figure 7A:
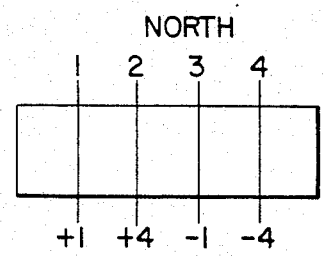
FIGS. 7a–7d are diagrams showing various interconnections of components shown in FIG. 6.
Figure 7B:
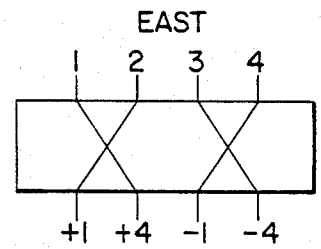
Figure 7C:
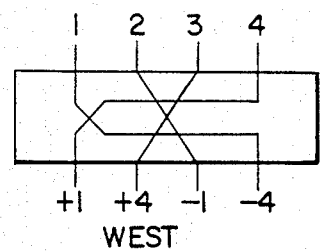
Figure 7D:
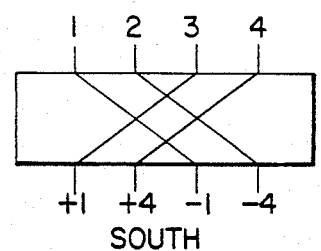

The four separate switching arrangements for elements 1–4 are indicated in FIGS. 7a–7d. For the north beam, shown in FIG. 7a, 1 is connected to +1, 2 is connected to +4, 3 is connected to −1, and 4 is connected to −4. The switching arrangements for the other three beam directions are shown in FIGS. 7b–7d.

Through the provision of 25 such switches, connected to the 25 respective groups of elements sharing four respective phase shifts, an array capable of producing four different beams can be provided simply and inexpensively.

The four phasing values associated with any group (j,k) can also be derived quite simply. Inspection of FIGS. 4a–4d in conjunction with FIG. 5 confirms that the phasing values of a given element group uniquely identified by the ordered coordinate pair (j,k) alternately shares four phasing values given by ±(j+k−1) and ±(j−k). Thus, the ordered coordinate pair (j,k) also uniquely defines one phase group of four phase shifters.

Generalization of the array to a 2n×2n array is completely straightforward. Such an array will contain $4n^2$ elements. These elements can be regarded as being in $n^2$ groups of four, and requiring $n^2$ switches and $n^2$ groups of 4 phasing means or phase shifters.

Figure 8:
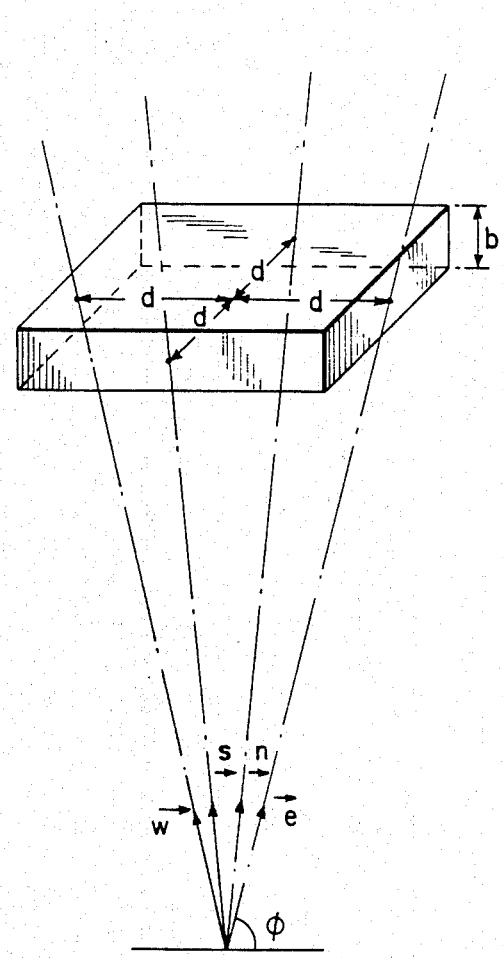
FIG. 8 is a diagram used to explain the geometry of wind velocity measurement using four beams.

The wind components measurable with a system according to the present invention can be used in the solution of a set of six equations and six unknowns to determine the characteristics of wind velocity as illustrated in FIG. 8. The problem in remote profiling is to determine the wind vector at the center of a parallelepiped or cell with the measurements along each of the four beams. The wind anywhere within the parallelepiped is regarded as a function of the velocity as measured at the edge and a gradient.

Vector dot products of the velocities measured by the beams with the wind vector provide four equations and six unknowns. A fifth equation comes from conservation of mass, i.e., from the assumption that the volume of air entering the cell equals the volume of air leaving the cell. A sixth equation comes from an assumed relationshp between vertical velocities for vertically adjacent cells. Thus, one arrives at six equations and six unknowns, which can be solved using known techniques of linear algebra, and specifically matrix algebra. In particular, the system of the equations may be solved by expressing them as a square matrix, which is then inverted. The matrix so formed is data independent and needs to be inverted only once for a given height.

Figure 9A:
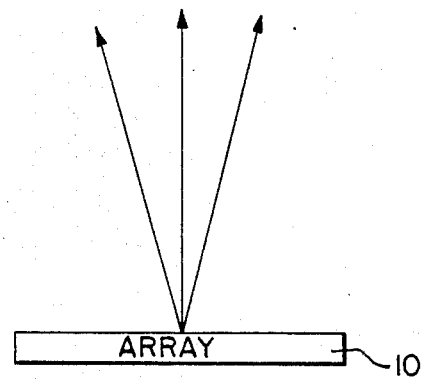
FIGS. 9a–9c are diagrams showing a second embodiment of the present invention.
Figure 9B:
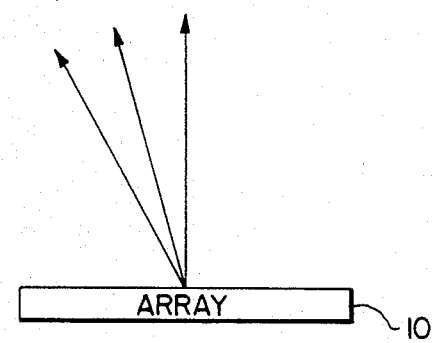
Figure 9C:
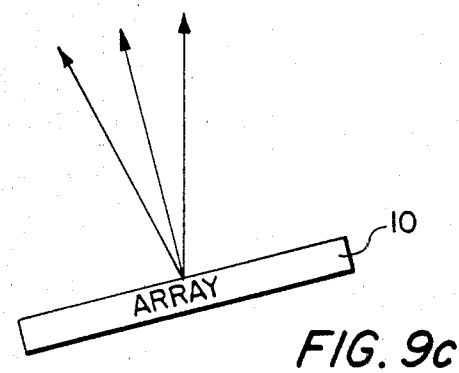

A further capability made possible by a four beam radar apparatus according to the present invention is creation of a four-beam system which can measure vertical winds directly as illustrated in FIGS. 9a–9c. In the four-beam apparatus just described, illustrated in FIG. 9a, four beams separated by 90 of azimuth and having elevation angles of 75° are created. If the array is "tipped" 15° along a diagonal, then the beam formerly pointing in the direction away from which the array was tipped would point directly vertically. For example, if the array were tipped 15° to the north, the south beam would be vertical, and the north beam would be at a 60° elevation angle. The east beam would point to the northeast and the west beam would point to the northwest, and their projections on a horizontal plane would be substantially orthogonal. In such a configuration, the apparatus would have the capabilities of a 3-beam profiler, with direct measurement of the vertical wind velocity, and an additional beam for verifying and corroborating measurements. The "tipping" is easily accomplished by "virtually tipping" the array through proper phasing of the distribution cables. The resultant beams are illustrated in FIG. 9(b). Alternatively, the array could be physically tipped by 15° as shown in FIG. 9(c). Either way, one achieves the advantages of having a vertical beam, two beams orthogonal as projected into the horizontal plane, and a free beam, all fairly simply and inexpensively.

The present invention has been described above with reference to two preferred embodiments. It should be understood, however, that these embodiments have been described merely as an aid to understanding the invention, and are not intended to be the sole examples of how the invention disclosed therein may be embodied. For example, it has already been described above how the system as described in connection with a 10×10 array can be used with square arrays having an even number of rows and columns of any size. Therefore, the invention should not be regarded as limited to the embodiments specifically described. Rather, the invention should be regarded to be of a scope commensurate with all that is encompassed by the appended claims.

What is claimed is:

1. A four-beam radar apparatus comprising:
   means for generating a driving signal;
   means connected to said generating means, for splitting said driving signal into $4n^2$ driving signals where n is a nonzero positive integer;
   $4n^2$ phase shifters divided in a predetermined fashion into $n^2$ phasing groups of four phase shifters apiece for generating predetermined phase shifts;
   $4n^2$ array elements arranged in a $2n \times 2n$ square matrix divided in a predetermined fashion into $n^2$ element groups of four array elements apiece;
   $n^2$ switching means respectively associated with one of said $n^2$ phasing groups and one of said $n^2$ element groups for selectably and alternately interconnecting said four elements in said element group and said four phase shifters in said phasing group in one of four alternate predetermined interconnections;
   said $4n^2$ array elements being arranged at positions $(\pm j, \pm k)$ where j and k are positive integers between one and n inclusively;
   each ordered coordinate pair j, k determining one of said $n^2$ element groups; and
   each ordered pair j, k determining one of said phasing groups, the four phase shifts being created by said group being determined by the product of a unit phase shift times $\pm x$ or $\pm y$, where x equals $(j+k-1)$, and where y equals $(j-k)$.

2. A four-beam radar as claimed in claim 1, wherein the frequency of said driving signal is 400 MHz, and said unit phase shift is equal to 76°.

3. A four-beam radar as claimed in claim 2 wherein n equals 5.

* * * * *